(12) United States Patent
Anderson et al.

(10) Patent No.: US 7,630,598 B2
(45) Date of Patent: Dec. 8, 2009

(54) APPARATUS AND METHOD FOR PROVIDING AN OPTICAL CROSS-CONNECT

(75) Inventors: Betty Lise Anderson, Gahanna, OH (US); David J. Rabb, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 11/801,105

(22) Filed: May 8, 2007

(65) Prior Publication Data

US 2007/0263958 A1 Nov. 15, 2007

Related U.S. Application Data

(60) Provisional application No. 60/799,425, filed on May 10, 2006.

(51) Int. Cl.
*G02B 6/26* (2006.01)

(52) U.S. Cl. .............................. 385/18; 385/15; 385/16; 359/838

(58) Field of Classification Search .................. 385/15, 385/16, 18; 359/838
See application file for complete search history.

(56) References Cited

U.S. PATENT DOCUMENTS 3,428,391 A 2/1969 Newcomer (Continued)

FOREIGN PATENT DOCUMENTS

| JP | 10333089 A2 | 12/1998 |
|---|---|---|
| WO | WO 01/14924 A1 | 3/2001 |
| WO | WO 02/29436 A1 | 4/2002 |
| WO | WO 03/075048 A2 | 9/2003 |
| WO | WO 03/083521 A2 | 10/2003 |
| WO | WO 03/083541 A2 | 10/2003 |

OTHER PUBLICATIONS

U.S. Appl. No. 11/182,111, Non-final Office Action, mailed Jan. 15, 2008.

(Continued)

*Primary Examiner*—Jennifer Doan
(74) *Attorney, Agent, or Firm*—Calfee, Halter & Griswold LLP

(57) ABSTRACT

An optical cross-connect for shifting the location of one or more light beams in and array of light beams is provided. An exemplary embodiment of an optical cross connect includes an input array for inputting an array of light beams; at least a portion of a spherical lens; a plurality of microelectrical mechanical devices; and a plurality of mirrors. The microelectrical mechanical devices are located at a distance away from the spherical lens that is approximately equal to the focal point of the spherical lens. The microelectrical mechanical devices include a plurality of individually controllable pixels for directing one or more light beams in the array of light beams through the at least a portion of a spherical lens and onto two or more mirrors. The two or more mirrors may be located at a distance away from the spherical lens that is approximately equal to the focal point of the spherical lens and are located generally opposite of one or more microelectrical mechanical devices. Each of the two or more mirrors may be positioned at different angles with respect to one another so that light beams incident each mirror are shifted differently with respect to one another and land on a subsequent microelectrical mechanical devices. Some exemplary embodiments also provide for grouping of the light beams prior to shifting their location, and regrouping the light beams after shifting their locations.

19 Claims, 7 Drawing Sheets

TOP VIEW

U.S. PATENT DOCUMENTS

| | | |
|---|---|---|
| 3,463,571 A | 8/1969 | Boehm et al. |
| 3,755,676 A | 8/1973 | Kinsel |
| 3,892,468 A | 7/1975 | Duguay |
| 4,225,938 A | 9/1980 | Turpin |
| 4,344,671 A | 8/1982 | Lang |
| 4,474,434 A | 10/1984 | Carlsen et al. |
| 4,474,435 A | 10/1984 | Carlsen et al. |
| 4,546,249 A | 10/1985 | Whitehouse et al. |
| 4,929,956 A | 5/1990 | Lee et al. |
| 5,018,816 A | 5/1991 | Murray et al. |
| 5,018,835 A | 5/1991 | Dorscher |
| 5,117,239 A | 5/1992 | Riza |
| 5,231,405 A | 7/1993 | Riza |
| 5,274,385 A | 12/1993 | Riza |
| 5,276,758 A | 1/1994 | Hughes |
| 5,319,477 A | 6/1994 | DeJule |
| 5,329,118 A | 7/1994 | Riza |
| 5,418,880 A | 5/1995 | Lewis et al. |
| 5,463,497 A | 10/1995 | Muraki et al. |
| 5,465,175 A | 11/1995 | Woodgate et al. |
| 5,475,525 A | 12/1995 | Tournois et al. |
| 5,512,907 A | 4/1996 | Riza |
| 5,592,333 A | 1/1997 | Lewis |
| 5,623,360 A | 4/1997 | Gesell et al. |
| 5,724,163 A | 3/1998 | David |
| 5,726,752 A | 3/1998 | Uno et al. |
| 5,767,956 A | 6/1998 | Yoshida |
| 5,852,693 A | 12/1998 | Jeong |
| 5,859,697 A | 1/1999 | Kaufeld et al. |
| 5,936,759 A | 8/1999 | Buttner |
| 5,973,727 A | 10/1999 | McGrew et al. |
| 6,014,244 A | 1/2000 | Chang |
| 6,040,880 A | 3/2000 | Tsuboi |
| 6,064,506 A | 5/2000 | Koops |
| 6,181,367 B1 | 1/2001 | McGrew et al. |
| 6,188,817 B1 | 2/2001 | Goodfellow |
| 6,236,506 B1 | 5/2001 | Cao |
| 6,266,176 B1 | 7/2001 | Anderson et al. |
| 6,323,981 B1 | 11/2001 | Jensen |
| 6,388,815 B1 | 5/2002 | Collins, Jr. et al. |
| 6,429,976 B1 | 8/2002 | Yamamoto et al. |
| 6,480,323 B1 | 11/2002 | Messner et al. |
| 6,522,404 B2 | 2/2003 | Mikes et al. |
| 6,525,889 B1 | 2/2003 | Collins, Jr. et al. |
| 6,535,340 B1 | 3/2003 | Saruwatari |
| 6,637,899 B2 | 10/2003 | Sunaga et al. |
| 6,647,164 B1 | 11/2003 | Weaver et al. |
| 6,674,939 B1 | 1/2004 | Anderson et al. |
| 6,711,316 B2 | 3/2004 | Ducellier |
| 6,724,535 B1 | 4/2004 | Clabburn |
| 6,724,951 B1 | 4/2004 | Anderson et al. |
| 6,734,955 B2 | 5/2004 | Wight et al. |
| 6,760,140 B1 | 7/2004 | Argueta-Diaz et al. |
| 6,816,307 B1 | 11/2004 | Sun |
| 6,922,277 B2 | 7/2005 | Moon et al. |
| 6,934,069 B2 | 8/2005 | Moon et al. |
| 6,952,306 B1 | 10/2005 | Anderson |
| 6,958,861 B1 | 10/2005 | Argueta-Diaz |
| 7,171,068 B2 | 1/2007 | Bartlett et al. |
| 7,215,474 B2 | 5/2007 | Argueta-Diaz |
| 7,236,238 B1 | 6/2007 | Durresi et al. |
| 2002/0030814 A1 | 3/2002 | Mikes et al. |
| 2003/0202731 A1 | 10/2003 | Ionov et al. |
| 2004/0190823 A1 | 9/2004 | Leuthold et al. |
| 2005/0007668 A1 | 1/2005 | Serati et al. |
| 2006/0034567 A1 | 2/2006 | Anderson et al. |
| 2006/0044987 A1 | 3/2006 | Anderson et al. |
| 2006/0061893 A1 | 3/2006 | Anderson et al. |
| 2006/0062517 A1 | 3/2006 | Anderson et al. |
| 2006/0114568 A1 | 6/2006 | Argueta-Diaz |

OTHER PUBLICATIONS

U.S. Appl. No. 11/184,535, Final Office Action, mailed Oct. 15, 2007.

U.S. Appl. No. 10/726,771, Durresi et al.

Anderson, et al., Increasing Efficiency of Optical Beam Steerers, Draft Technical Report #3 for Harris Corporation, The Ohio State University, May 30, 2003, pp. 1-11.

Anderson et al., Binary-Counting True Time Delay Generator Using a White Cell Design and Deformable Mirror Devices, LEOS, Orlando, FL, Dec. 1998, 2 pgs.

Anderson et al., Design Advances in Feee-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More . . . , presentation at University of Colorado Jan. 28, 2003, 61 pgs.

Anderson et al., Steering of Optical Beams Using True-Time Delay Based on the White Cell, Optical Society of America, 2005, 4 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz et al., Binary Optical Interconnection: Patent Disclosure Addendum, Mar. 7, 2005, pp. 1-47.

Argueta-Diaz, et al., Optical Cross-Connect System Based on the White Cell and 3-State MEMS: Experimental Demonstration of the Quartic Cell, accepted by Applied Optics Jan. 2006, pp. 1-11.

Argueta-Diaz, et al. Reconfigurable Photonic Switch Based on a Binary System Using the White Cell and Micromirror Arrays, IEEE Journal of Selected Topics in Quantum Electronics, vol. 9, No. 2 Mar./Apr. 2003, pp. 594-602.

Chen et al., 1-to-12 Surface Normal Three-Dimensional Optical Interconnects, Applied Physics Letters 63(14), Oct. 4, 1993, pp. 1883-1885.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceedings of the 1978 International Optical Computing Conference, London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell, GOMAC, Monterey, CA, Mar. 1999, 4 pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, SPIE Great Lakes Regional Symposium, Cleveland, OH, Jun. 7, 2004, pp. 1-23.

Fairley et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 293-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.

Higgins et al., Design and demonstration of a switching engine for a binary true-time-delay device that uses a White cell, Applied Optics, vol. 42, No. 23, Aug. 10, 2003, pp. 4747-4757.

Kunathikom, et al. Design of Delay Elements in Binary Optical True-Time Delay Device that uses a White Cell, Applied Optics, vol. 42, No. 35, Dec. 10, 2003, pp 6984-6994.

Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.

Liu et al., Cascaded Energy-Optimized Linear Volume Hologram Array for 1-to-many Surface-Normal Even Fan-Outs, Optics and Laser Technology, vol. 29, No. 6, 1997, pp. 321-325.

Mital, et al., Design and Demonstration of an Optical True-Time-Delay Device Based on an Octic-Style White Cell, Journal of Lightwave Technology, vol. 24, No. 2, Feb. 2006, pp. 982-990.

Rader, et al., Demonstration of a Linear Optical True-time Delay Device by Use of a Microelectromechanical Mirror Array, Applied Optics, vol. 42, No. 8, Mar. 10, 2003, pp. 1409-1416.

Saleh et al., Fundamentals of Photonics, Wiley, Aug. 1991.

White, Long Optical Paths of Large Aperture, Journal Optical Society America, vol. 32, May 1942, pp. 285-288.

White, Very Long Optical Paths in Air, Journal Optical Society America, vol. 66, No. 5, May 1976, pp. 411-416.

Yen et al., Operation of a Numerical Optical Data Processor, 1980, SPIE vol. 232, International Optical Computing Conference, 1980, pp. 160-167.

Chiou et al., A Mirror Device with Tilt and Piston Motions, Oct. 1999, SPIE, vol. 3893, pp. 298-303.

U.S. Appl. No. 09/645,136, Non-final Office Action, mailed Aug. 15, 2001.

U.S. Appl. No. 09/645,136, Notice of Allowance and Fee(s) Due and Notice of Allowability with Examiner's Statement of Reasons for Allowance, mailed Feb. 26, 2002.

U.S. Appl. No. 09/688,478, Non-final Office Action, mailed Jan. 20, 2002.

U.S. Appl. No. 09/688,478, Notice of Allowance and Fee(s) Due and Notice of Allowability with Examiner's Statement of Reasons for Allowance, mailed Jul. 2, 2002.

U.S. Appl. No. 09/688,904, Notice of Allowance and Issue Fee Due and Notice of Allowability with Examiner's Amendment and Examiner's Statement of Reasons for Allowance, mailed Jan. 1, 2001.

U.S. Appl. No. 10/086,355, Non-final Office Action, mailed Feb. 2, 2003.

U.S. Appl. No. 10/086,355, Non-final Office Action, mailed Aug. 13, 2003.

U.S. Appl. No. 10/086,355, Notice of Allowance and Fee(s) Due and Notice of Allowability with Examiner's Amendment, Examiner's Statement of Reasons for Allowance, and Interview Summary, mailed Feb. 18, 2004.

Int'l App. No. PCT/US03/06189, International Search Report, mailed Oct. 20, 2003.

U.S. Appl. No. 10/106,177, Notice of Allowance and Fee(s) Due and Notice of Allowability with Examiner's Statement of Reasons for Allowance, mailed Jun. 12, 2003.

Int'l App. No. PCT/US03/09246, International Search Report, mailed Sep. 4, 2003.

Int'l App. No. PCT/US03/09246, International Preliminary Examination Report, completed Dec. 11, 2003.

U.S. Appl. No. 10/106,776, Non-final Office Action, mailed Jun. 10, 2003.

U.S. Appl. No. 10/106,776, Final Office Action, mailed Nov. 21, 2003.

U.S. Appl. No. 10/106,776, Notice of Allowance and Fee(s) Due and Notice of Allowability, mailed Dec. 11, 2003.

Int'l App. No. PCT/US03/09242, International Search Report, mailed Sep. 23, 2003.

Int'l App. No. PCT/US03/09242, International Preliminary Examination Report, completed Sep. 8, 2004.

U.S. Appl. No. 10/726,770, Non-final Office Action, mailed Aug. 20, 2004.

U.S. Appl. No. 10/726,770, Notice of Allowance and Fee(s) Due and Notice of Allowability with Examiner's Amendment, Examiner's Statement of Reasons for Allowance, and Interview Summary, mailed May 5, 2005.

U.S. Appl. No. 10/726,771, Non-final Office Action, mailed Jan. 1, 2005.

U.S. Appl. No. 10/726,771, Final Office Action, mailed Oct. 6, 2005.

U.S. Appl. No. 10/726,771, Non-final Office Action, mailed Jan. 30, 2006.

U.S. Appl. No. 10/726,771, Notice of Allowance and Fee(s) Due and Notice of Allowability with Examiner's Statement of Reasons for Allowance and Interview Summary, mailed Sep. 12, 2006.

U.S. Appl. No. 10/726,771, Notice of Allowance and Fee(s) Due and Notice of Allowability with Examiner's Statement of Reasons for Allowance, mailed Feb. 28, 2007.

U.S. Appl. No. 10/727,009, Notice of Allowance and Fee(s) Due and Notice of Allowability with Examiner's Statement of Reasons for Allowance, mailed Dec. 7, 2004.

U.S. Appl. No. 10/727,009, Notice of Allowance and Fee(s) Due and Notice of Allowability with Examiner's Statement of Reasons for Allowance, mailed May 24, 2005.

U.S. Appl. No. 11/184,535, Non-final Office Action, mailed Oct. 10, 2006.

U.S. Appl. No. 11/184,535, Non-final Office Action, mailed Apr. 3, 2007.

U.S. Appl. No. 11/183,029, Non-final Office Action, mailed Nov. 20, 2006.

U.S. Appl. No. 11/256,578, Non-final Office Action, mailed Mar. 29, 2006.

U.S. Appl. No. 10/256,578, Notice of Allowance and Fee(s) Due and Notice of Allowability with Examiner's Statement of Reasons for Allowance, mailed Aug. 17, 2006.

U.S. Appl. No. 10/256,578, Notice of Allowance and Fee(s) Due and Notice of Allowability with Examiner's Statement of Reasons for Allowance, mailed Dec. 6, 2006.

Collins et al., An Experimental Numerical Optical Processor (NOP), Digest of Papers for Compcon 78, IEEE catalog No. 78CH1328-4C, San Francisco, CA, Feb. 28-Mar. 3, 1978, pp. 198-199.

Collins, Jr., The Design of Devices for Producing Optically Controlled Incremental Time Delays for Phased Array Radars, National Reconnaissance Office, Contract No. NRO-98-C-6002, Technical Report 736076-1, The Ohio State University, Oct. 1998, 60 pages.

Collins, Jr. et al., True Time Delay with Binary Time Delay for Large Arrays, 1998 Antenna Applications Symposium, Allerton Park, Monticello, IL, Sep. 1998, 13 pages.

Dolphi et al., Experimental Demonstration of a Phased-Array Antenna Optically Controlled with Phase and Time Delays, Applied Optics, vol. 35, No. 26, Sep. 10, 1006, pp. 5293-5300.

Int'l App. No. PCT/US00/23361, International Search Report, mailed Jan. 8, 2001.

Int'l App. No. PCT/US00/23361, International Preliminary Examination Report, completed May 8, 2001.

EP App. No. 00 96 1366, Supplementary European Search Report, completed Apr. 3, 2003.

Bishop et al., The Rise of Optical Switching, Scientific American, Jan. 2001, pp. 88-94.

Hect, Many Approaches Taken for All-Optical Switching, Laser Focus World, www.optoelectronics-world.com, Aug. 2001, 5 pgs.

Webb et al., Stroke Amplifier for Deformable Mirrors, Applied Optics, vol. 43, No. 28, Oct. 1, 2004, pp. 5330-5333.

Zdeblick, Design Variables Prevent a Single Industry Standard, Laser Focus World, www.optoelectronics-world.com, Mar. 2001, 4 pgs.

U.S. Appl. No. 11/184,535, Notice of Allowance and Fee(s) Due and Notice of Allowability with Examiner's Statement of Reasons for Allowance, mailed Jan. 31, 2008, 6 pages.

U.S. Appl. No. 11/184,536, Non-final Office Action, mailed May 1, 2008, 9 pages.

U.S. Appl. No. 11/182,111, Final Office Action, mailed Sep. 3, 2008, 16 pages.

Amendment from U.S. Appl. No. 11/182,111 dated Mar. 3, 2009.

Final Office action from U.S. Appl. No. 11/184,536 dated Dec. 8, 2008.

Amendment from U.S. Appl. No. 11/184,536 dated Aug. 1, 2008.

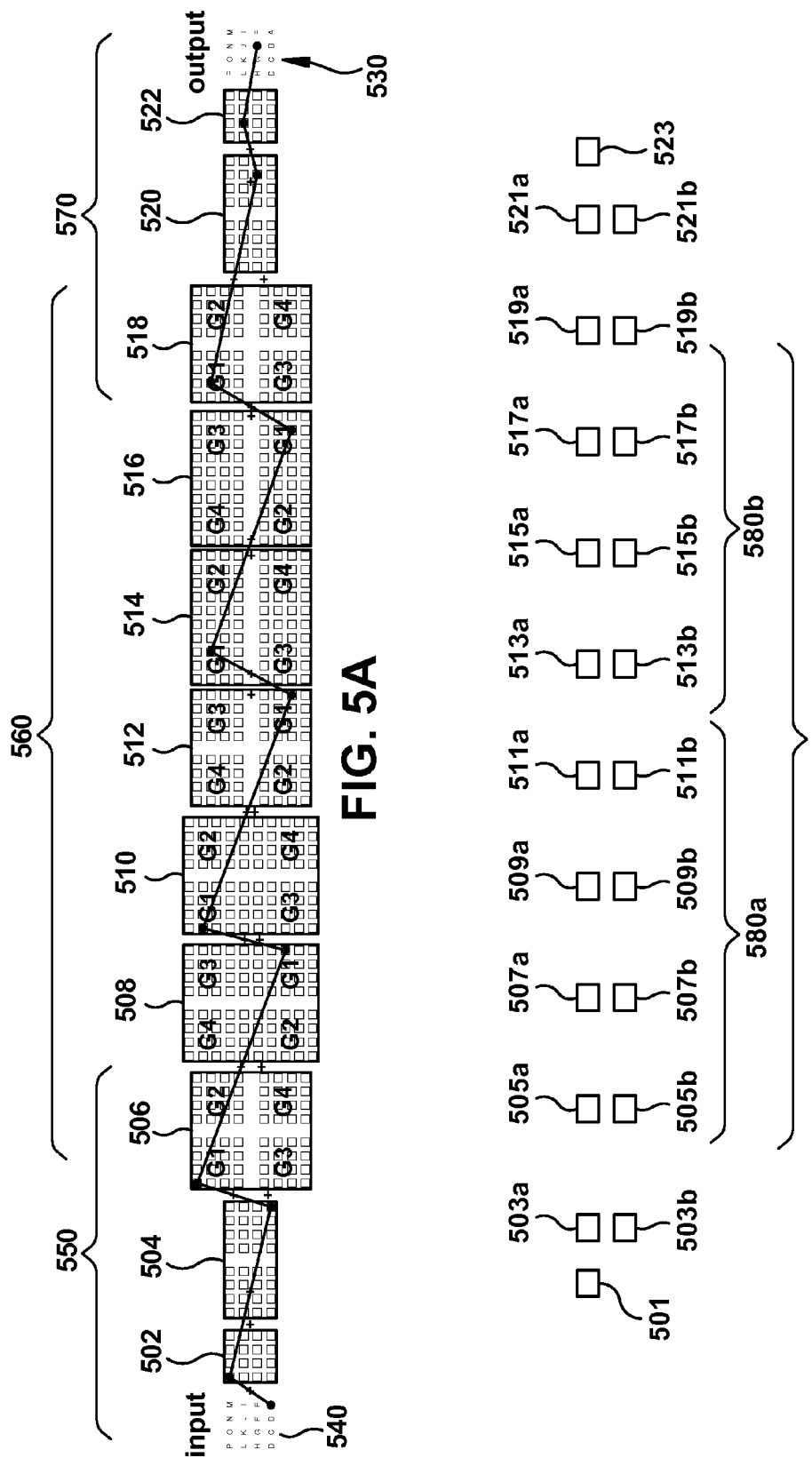

APPARATUS AND METHOD FOR PROVIDING AN OPTICAL CROSS-CONNECT

RELATED APPLICATIONS

This application claims all of the benefits of, and priority to, U.S. Provisional Application Ser. No. 60/799,425, filed on May 10, 2006: May 10, 2006. Application Ser. No. 60/799, 425 is titled Apparatus and Method For Providing an Optical Cross-Connect and is incorporated herein in its entirety.

FIELD

This invention relates generally to optical cross-connects. Exemplary cross-connects use a spherical Fourier cell. In one exemplary embodiment, the optical cross-connect provides a non-blocking cross-connect between two arrays of input light beams. Other exemplary embodiments provide an optical cross-connect with grouping.

BACKGROUND

Optical cross-connects are used to shift one or more light beams from one position in an array of light beams to another position in the array of light beams. Optical cross-connects may be used in routers for optical telecommunications systems, or in any situation where a set of optical input ports must be connected to another set of optical output ports, either programmably or in a fixed manner.

Prior systems and methods for providing optical cross-connects take up considerable space and are cumbersome.

SUMMARY

An optical cross-connect for shifting the location of one or more light beams in an array of light beams is provided. An exemplary embodiment of an optical cross connect includes an input array for inputting an array of light beams; at least a portion of a spherical lens; a plurality of microelectrical opto-mechanical devices; and a plurality of mirrors. The microelectrical mechanical devices are located at a distance away from the spherical lens that is approximately equal to the focal point of the spherical lens. The microelectrical mechanical devices include a plurality of individually controllable pixels for directing one or more light beams in the array of light beams through the at least a portion of a spherical lens and onto two or more mirrors. The two or more mirrors may be located at a distance away from the center of the spherical lens that is approximately equal to the focal length of the spherical lens and are located generally opposite of one or more microelectrical mechanical devices. Each of the two or more mirrors may be positioned at different angles with respect to one another so that light beams incident each mirror are shifted differently with respect to one another and land on a subsequent microelectrical mechanical devices. Some exemplary embodiments also provide for grouping of the light beams prior to shifting their location, and regrouping the light beams after shifting their locations.

BRIEF DESCRIPTION OF THE FIGURES

FIG. 5 is an exemplary embodiment of a spherical Fourier cell configured for an optical cross-connect with grouping viewed from the center of the sphere. The top part (a) is a view as would be seen looking in one direction from the center of the sphere (toward the MEMS), and the bottom part is a view as would be seen looking in the opposite direction.

DETAILED DESCRIPTION

Figure 1A:
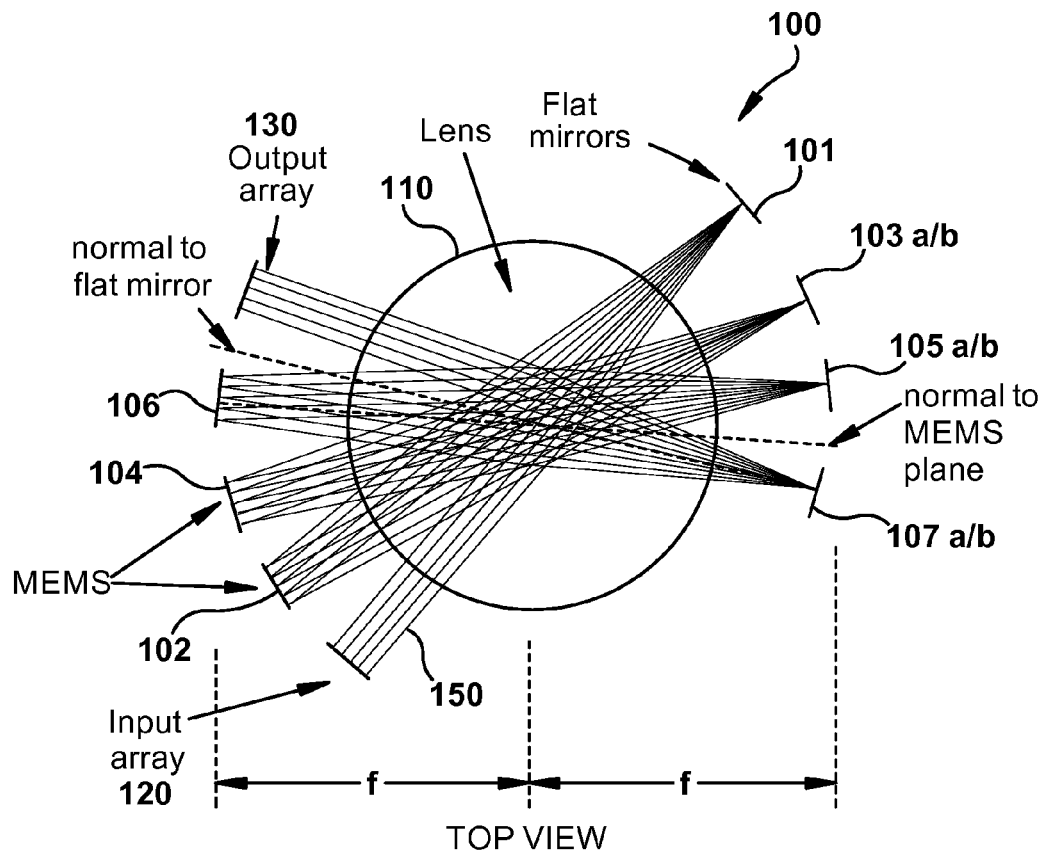
FIG. 1A is a cross-section of an exemplary embodiment of a spherical Fourier cell that includes a spherical lens, an input array, a plurality of micro-electrical mirrors, a plurality of mirrors and an output array.
Figure 1B:
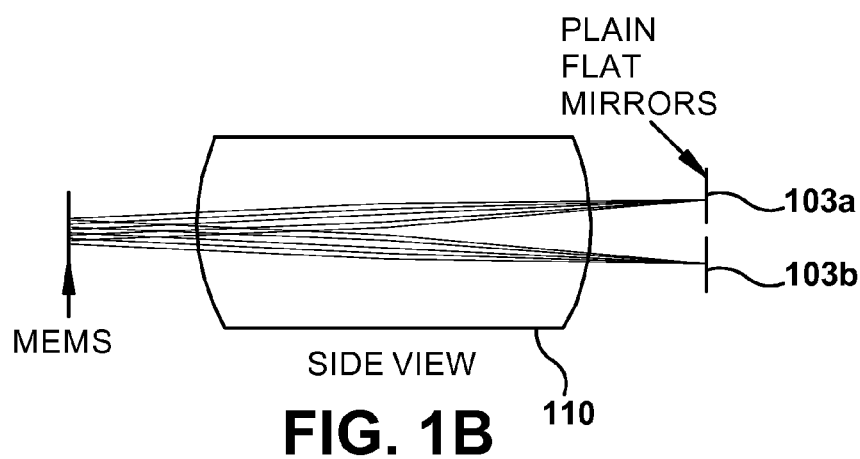
FIG. 1B is a side view of the embodiment of FIG. 1A.

The present invention utilizes a series of micro-electrical mechanical systems (MEMS), and a series of mirrors arranged in a spherical pattern around a spherical lens. Copending application Ser. No. 60/799,285 "Apparatus and Method for Providing True Time Delay in an Optical Signal Using a Fourier cell" which was invented by co-inventor David. Rabb and filed concurrently herewith is incorporated herein by reference. The spherical Fourier cell is more fully described in the co-filed application, and a brief description is provided herein. FIG. 1A illustrates an exemplary spherical Fourier cell 100 that includes a spherical lens 110, which in this example comprises a section of a sphere. The spherical lens 110 is at the center of a larger imaginary sphere that has a diameter 2 f, where f is the focal length of spherical lens 110. The larger imaginary sphere is not an actual sphere, but rather identifies exemplary locations of the mirrors and MEMS devices that direct light beams through the spherical lens 110. In FIG. 1A, arranged on the left side of the large imaginary sphere are a series of MEMS arrays, namely MEMS 102, MEMS 104, and MEMS 106. On the opposite side of the larger imaginary sphere is mirror 101 and three additional pairs of mirrors 103a/b, 105a/b and 107a/b. In each pair of mirrors, one pair is located above the other, for example, in mirror pair 103a/b, mirror 103a is above mirror 103b. (FIG. 1B). Input array 120 and output array 130 are also shown. The input array 120 and output array 120 include an array of light beams, which may be generated by, for example, an array of optical fibers.

In operation, light beams 150 from the input array 120, whose axes are parallel, are projected through spherical lens 110 onto mirror 101. Spherical lens 110 causes the parallel light beam formation from input array 120 to converge on a point on mirror 101. Mirror 101 is tipped or aligned so that the light beams 150 are directed to MEMS 102. The spherical lens 110 causes the light beams 150 to separate back into individual parallel light beams focused on individual spots or pixels (not shown) in the array of pixels on MEMS 102. The array of pixels on MEMS 102 can tip to one of several angles.

In this embodiment three possible MEMS pixel tilt angles, +Θ up, −Θ down (in the side view) and 0° are used. If the pixel for a particular beam is tipped up +Θ, that particular beam is directed to and converges on the center of the upper mirror 103a. Indeed, all light beams incident on pixels on MEMS 102 that are tipped "up" +Θ, converge on the same spot in the center of the upper mirror 103a. Similarly, all light beams incident MEMS 102 pixels that are tipped downward −Θ converge on the center or lower mirror 103b.

Figure 2A:
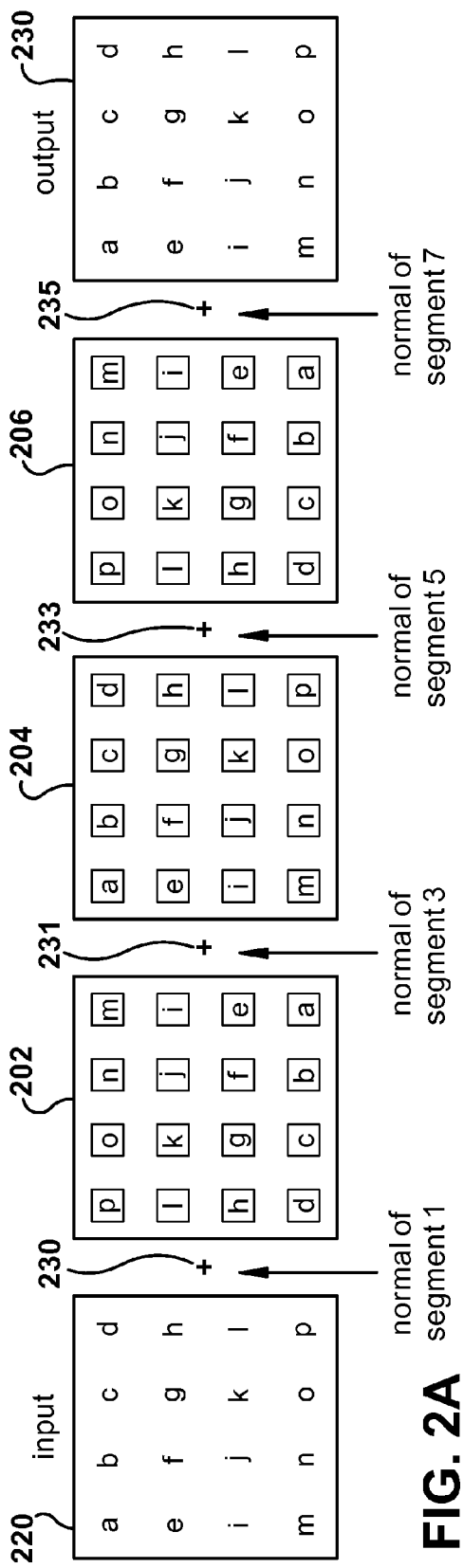
FIG. 2 is a view of an exemplary embodiment of a spherical Fourier cell viewed from the center of the sphere. The top part (a) is a view from one direction as would be seen looking from the center of the sphere (toward the MEMS), and the bottom part (b) is view as would be seen looking in the opposite direction.
Figure 2B:
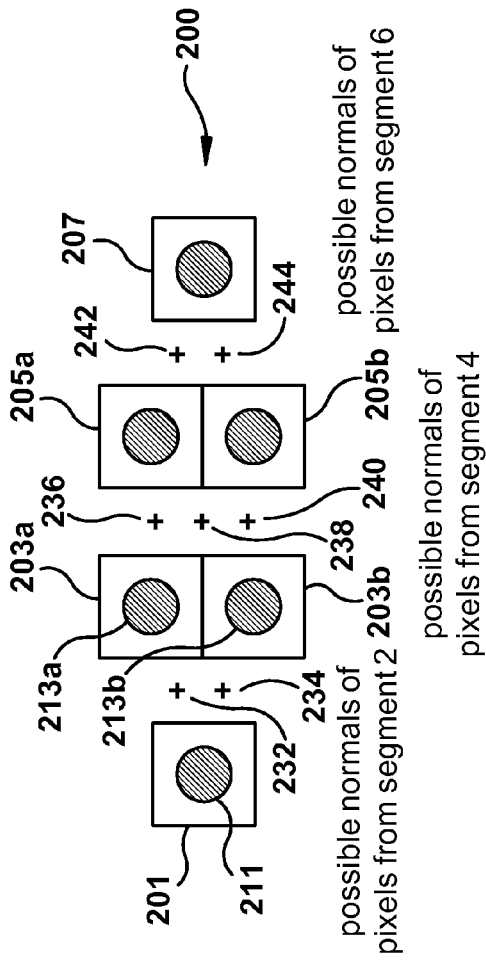

FIG. 2 illustrates two views in an exemplary spherical Fourier cell 200 looking from the inside of the spherical lens (not shown). In the top part (a) of the figure, the point of view is looking from the center of the lens (not shown) toward the MEMS segments. In the bottom (b) of the figure, the perspective is from the center of the lens toward the plain flat mirrors. The Fourier cell 200 includes: a lens (not shown); an input array 220; MEMS 202, MEMS 204, and MEMS 206; mirror 201, mirror 203a, mirror 203b, mirror 205a, mirror 205b and mirror 207; and output array 230. Mirrors 201, 203a, 20b, 205a, 205b, and 207 may also be called Fourier mirrors. Input array 220 has 16 input light beams arranged in a 4×4 matrix array. The light beams are labeled a-p. The "+" 230 between the input array 220 and MEMS 202 represents the intersection of the normal axis of mirror 201 with the larger imaginary sphere. The normals for each mirror pass through the center of the spherical lens. The input array 220 of light beams a-p are directed through the spherical lens and Fourier-transformed onto mirror 201. As noted above, parallel light beams passing through the spherical lens converge on a point on the mirror. Circle 211 indicates the region where light beams a-p projected from input array 220 are coincident on mirror 201. The array of light beams a-p pass back through the spherical lens and are inverse-transformed onto MEMS 202. MEMS 202 includes a 16 pixel matrix array arranged in a 4×4 matrix so that the light beams a-p are incident on the pixels. The light beams a-p reflected on MEMS 202 form an inverted image of the input array because of the −1 magnification from one MEMS to the next.

Shown between mirror 203a/b and 201 are two "+" signs +232, +234, one for each of two MEMS pixel tip angles (only two angles are used here ). +232 indicates the normal axis from the pixels in MEMS 202 that are tipped down at −Θ degrees. Similarly, +234 indicates the normal axis to the pixels in MEMS 202 that are tipped at +Θ degrees. Light beams a-p are directed to either mirror 203a or 203b depending on whether the MEMS 202 pixels are tipped up +Θ or down −Θ. Circle 213a indicates the point of convergence for light beams projecting on mirror 203a, that is light beams from MEMS 202 pixels that are tipped up at +Θ degrees. Similarly circle 213b indicates the point of convergence for light beam from MEMS 202 pixels that are tipped down at −Θ degrees.

Mirrors 203a/b both direct their light beams onto MEMS 204. In this example, a light beam that bounced onto either mirror 203a or mirror 203b will land on the same pixel as it would have if it had bounced off the other mirror because of this particular alignment of the mirrors. +231 indicates the intersection of the normals of the mirrors 203a and 203b and the larger sphere. Again, the normals are from the centers of the light beams on the upper mirror 203a and lower mirror 203b through the center of the spherical lens to the intersection of the large imaginary sphere. The intersections of the normals are the same because the upper mirror 203a and lower mirror 203b are tipped at slightly different angles. Similarly, +233 is the normal to mirrors 205a, 205b and +235 is the normal to mirror 207. +236, +238 and +240 indicate the normals to pixels in MEMS 204. +236 indicates normals to pixels that are tipped up +Θ, +238 indicates normals to pixels in MEMS 204 that are not tipped, and +240 indicates normals to pixels in MEMS 204 that are tipped down −Θ.

The exemplary spherical Fourier cell 200 described above forms the basis for optical cross-connects described herein. However, the angles or tilts of the pairs of mirrors need to be changed for embodiments with optical cross-connects. Optical cross-connects may be used to change the location of a light beam in an array of light beams. For example, it may be desired to shift light beam a from the upper left corner of the input array 220 down 1 row and to the right 1 column at output 230. To achieve the desired optical cross-connect, the tilts of the mirrors and realigned, i.e., the normals of the mirrors are changed so that the light beams are directed to different positions based on whether they strike the upper or lower mirror. An exemplary embodiment of such an optical cross-connect is provided in FIG. 3. The maximum size of the MEMS required for the optical cross-connect is 1.5 $pN^{3/4}$, where N is the number of inputs/outputs and p is the pixel pitch.

The following figures are directed toward various exemplary embodiments, applications and aspects of the present invention. For example, an exemplary optical cross-connect device for shifting the location of one or more light beams in an array of light beams includes: an input array for inputting an array of light beams; a lens; a plurality of microelectrical-mechanical devices; and a plurality of mirrors. In one embodiment, the microelectrical-mechanical devices are located at a distance away from the principal planes of the lens that is approximately equal to the focal length of the lens, and the microelectrical-mechanical devices comprise controllable pixels for directing one or more light beams in the array of light beams through the lens and onto two or more of the plurality of mirrors. In addition, two or more of the plurality of mirrors are located at a distance away from the principal planes of the lens that is approximately equal to the focal length of the lens and are located generally opposite of one or more microelectrical-mechanical devices. Each of two or more of the plurality of mirrors are positioned at different angles with respect to one another so that light beams incident on each mirror are shifted differently with respect to one another as they land on a subsequent microelectrical-mechanical devices.

In addition, an exemplary method of shifting the location of one or more light beams in a light beam array is disclosed and one embodiment includes: bouncing an array of light beams off of a microelectrical mechanical device; adjusting one or more pixels on the microelectrical mechanical device so that light beams incident on the one or more pixels are directed through at least a portion of a spherical lens onto at least a first mirror or a second mirror; shifting one or more of the light beams to a different location as a function of whether the pixels on the microelectrical mechanical device directs the light beams to the first mirror or the second mirror; and repeating any of the previous steps until the light beams desired to be shifted have been shifted to a desired position.

Another exemplary device for altering the location of one or more light beams in an array of light beams is disclosed and includes: means for providing an array of light beams; controller means for directing one or more light beams in the array of light beams through a lens onto one of two director means for directing the one or more light beams back through the lens onto a subsequent controller means for directing one or more light beams. Wherein the controller means can direct individual light beams onto either of the two directing means;

and the directing means shifts the light beams as a function of the alignment of the directing means.

Still yet another exemplary apparatus for shifting the location of one or more light beams in a light beam array is disclosed and includes: means for bouncing an array of light beams off of a microelectrical mechanical device; means for adjusting one or more pixels on the microelectrical mechanical device so that light beams incident on the one or more pixels are directed through at least a portion of a lens onto at least a first mirror or a second mirror; and means for shifting one or more of the light beams to a different location as a function of whether the pixels on the microelectrical mechanical devices directed the light beams to the first mirror or the second mirror.

Figure 3A:
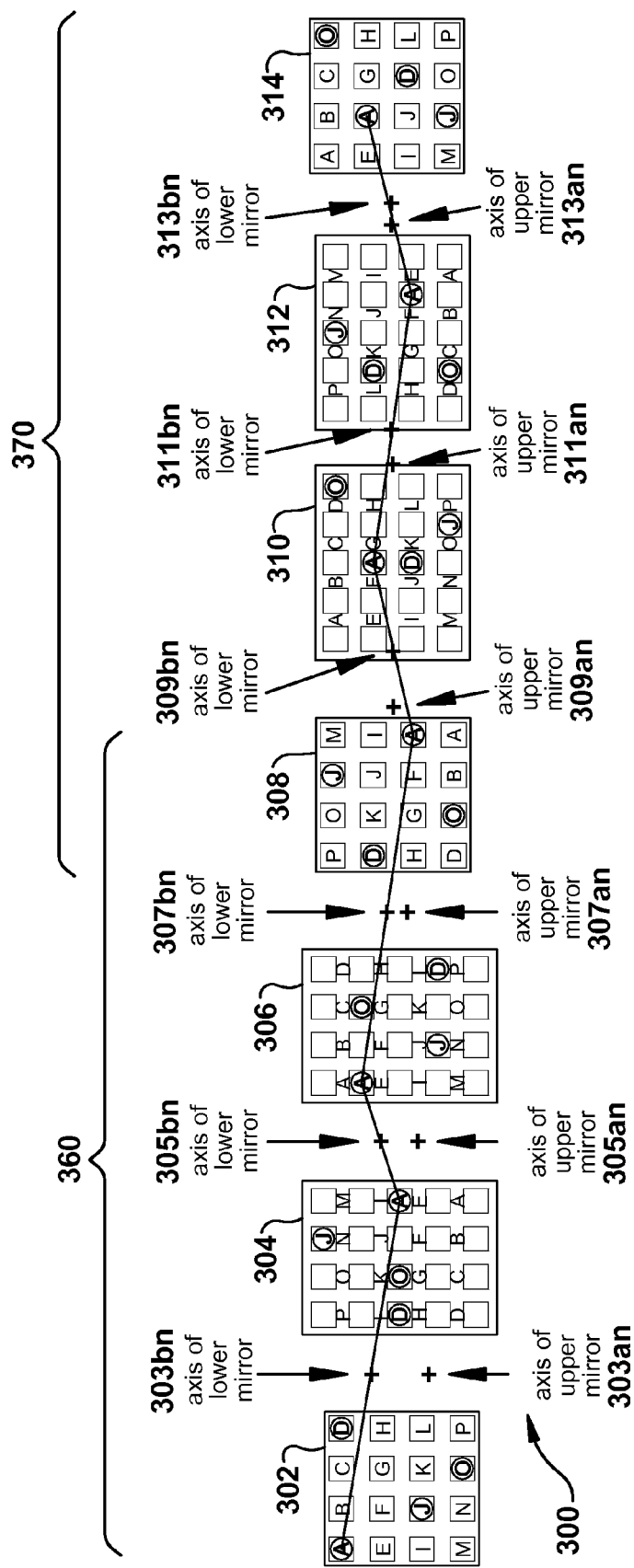
FIG. 3 is a view of another exemplary embodiment of a spherical Fourier cell configured for an optical cross-connect viewed from the center of the sphere. The top part (a) is a view as would be seen looking in one direction from the center of the sphere (toward the MEMS), and the bottom part (b) is a view as would be seen looking in the opposite direction.
Figure 3B:
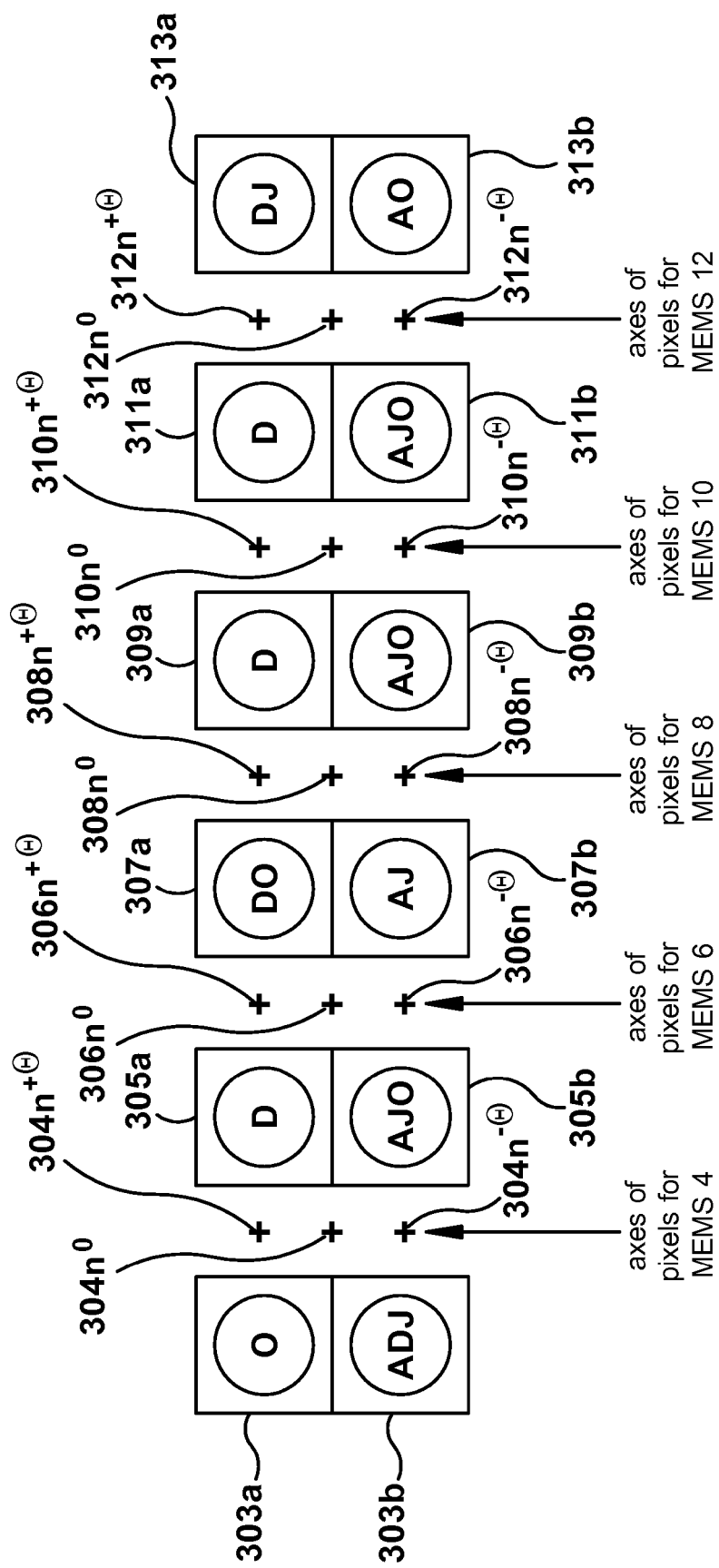

FIG. 3 illustrates an exemplary embodiment of an optical cross-connect 300 that is not non-blocking. It is not non-blocking because it is possible that multiple light beams may be incident on the same MEMS pixel while the light beams are being shifted to a new location. In the top part (a) of the figure, the point of view is looking from the center of the lens toward the MEMS segments. In the bottom (a) of the figure, the perspective is from the center of the lens toward the plain flat mirrors. FIG. 3 includes a lens (not shown), MEMS 302, MEMS 304, MEMS 306, MEMS 308, MEMS 310, MEMS 312 and MEMS 314 as viewed from the center of the system. The MEMS segments are flat and are positioned along a large imaginary sphere that has a radius equal to the focal length f of the spherical lens (not shown). The normals of the MEMS segments and the normals of the mirrors pass through the center of the spherical lens (not shown) and intersect with the large imaginary sphere. These normals are represented by "+"s in the figures.

The first portion 360 of the optical cross-connect 300 is used to shift the light beams to a different row. This embodiment includes a 4×4 square input array (not shown) of light beams a-p. The input array has been imaged on MEMS 302. The MEMS devices have three-states, i.e. the pixels can be tilted to −Θ, 0, or +Θ. Light beams a-p from MEMS 302 pass through spherical lens (not shown) and are directed onto either mirror 303a or mirror 303b.

The pixels on MEMS 302 are tipped up +Θ or down −Θ. Light beams from pixels that are tipped up +Θ pass through the spherical lens and converge on a spot near the center of mirror 303a. Light beams from pixels that are tilted down −Θ pass through the spherical lens and converge on a spot near the center of mirror 303b. As an example, the paths of four light beams, a, d, j, and o are described below. Pixels on MEMS 302 for light beams a, d and j are tipped down at −Θ and the pixel for light beam o is tipped up +Θ. As a result, light beams a, d and j are directed to mirror segment 303b while light beam o is directed to mirror segment 303a.

MEMS 304 has a 4×5 pixel matrix array. Because MEMS 304 has a 4×5 pixel matrix array, the rows of pixels are shifted up ½ row with respect to the 4×4 pixel matrix array of MEMS 302. As a result, the light beams a-p that are reflected off of mirror segments 303a and 303b must be shifted ½ row in addition to any desired shift of the light beams so that they land on a pixel in MEMS 304. The shifts are accomplished by adjusting the angles of mirror 303a and mirror 303b. Adjusting the angles of the mirrors, and thus normals +303an and +303bn, determines where the light beams a-p will land on MEMS 304. In this embodiment since MEMS 304 is shifted 2 row with respect to MEMS 302, mirror segments 303a and 303b are tipped to shift the light beams +1½ rows and −1½ rows respectively. This shift accounts for the ½ row of offset caused by the larger MEMS segment plus the desired full row shift. The light beams reflected from mirror 303a and mirror 303b pass back through the spherical lens and exit the spherical lens as parallel light beam rays incident on pixels in MEMS 304. It is important to remember that the parallel light beam rays a-p are now an inverted image of the array of beam on MEMS array 302, i.e., the light beam pattern is upside down and backward.

All of the light beams have been shifted ±½ rows when imaged again at MEMS 304. This movement depends on whether the light beam is directed to mirror 303a or mirror 303b. For example, at MEMS 304 light beams a, d and j were moved down 1½ rows because they were directed to mirror segment 303b, while light beam o moved up 1½ rows because it was directed to mirror segment 303a. (Note that because the light beam array is an inverse transformation at MEMS 304, light beam a, d, and j appear to have moved up and light beam o appears to have moved down. However, in actuality light beams a, b and j moved down and light beam o moved up.)

The light beams a-p are directed from MEMS 304 through the spherical lens and converge on either mirror 305a or mirror 305b depending on the tilt angle of the pixel that the light beams are incident upon MEMS 304. Continuing with the example, the pixels for light beams a, j and o are directed down −Θ and thus, converge on mirror 305b. The pixel for light beam d is tilted up +Θ and light beam d converges on mirror 305a. MEMS 306 also has a 4×5 pixel matrix array and mirror 305a and mirror 305b are positioned so that the beams reflecting from mirror 305a and mirror 305b land on pixels in MEMS 306. Since the 4×5 pixel matrix array of MEMS 304 and MEMS 306 line up, mirror 305a and mirror 305b are tilted so that they shift the light beams up or down a full row. In this example, light beams a, j and o are reflected through the spherical lens and on to MEMS 306. Light beam a, is shown ½ of a row down from its original position in MEMS 302 (or up 1 full row from MEMS 306) while light beam d is shown 3½ rows from its original position in MEMS 302. Light beam o is shown up 2½ rows from its original position in MEMS 302 and light beam j is shown down ½ row from its original position.

The light beams reflected from MEMS 306 pass through the spherical lens and, depending upon the pixel tip angle, the light beams converge on either mirror 307a or mirror 307b. In this example, pixels for light beams d and o are tilted up +Θ and converge on mirror segment 307a. The pixels for light beams a and j are tilted down −Θ and converge on 307b.

The light beams reflected from mirrors 307a and 307b pass back through the spherical lens, are again separated into parallel light beams and are land on pixels in MEMS 308. MEMS 308 has 4×4 pixel matrix, which is shifted with respect to MEMS 306 ½ of a row of pixels. As a result, mirror 307a and mirror 307b are tipped so that normals 307an, 307bn are aligned to shift the light beams ½ row so that the light beams are incident on pixels on MEMS 308. MEMS 308 is a 4×4 pixel matrix array and is an inverted image of the MEMS 302. As shown in the figures, because of the tilting of the pixels in MEMS 302, MEMS 304 and MEMS 306, and mirror alignments, light beams a, j, d and o have been shifted to different rows. That is, light beam a shifted up one row on 308 from its original position on 302, light beam d shifted up one row, light beam o is in the same row and light beam j has moved down two rows. (Note that these up and down movements only appear to be the opposite directions in the figure because MEMS 308 is an inverted image of MEMS 302.)

The second portion 370 of optical cross-connect 300 is used to shift light beams to other columns. The light beams from MEMS 308 are directed through the spherical lens and depending on the tip angle of the pixels, land on either mirror 309a and or mirror 309b. In the present example, the pixel for light beam d is tilted up +⊖ and light beam d converges on mirror 309a, while pixels for light beams a, j and o are tilted down –⊖ causing light beams a, j and o to converge on mirror 309b. MEMS 310 has a 5×4 pixel matrix array and is thus shifted ½ of a pixel column with respect to MEMS 308, which has a 4×4 pixel matrix array. Mirror 309a and mirror 309b are tilted so that they shift the light beams by +/–1½ columns. (The desired 1 column shift plus the ½ column offset.) In this example, light beam d bounces off mirror 309a is shifted 1½ columns to the left (compared to its original column on 302, and taking into account that this is an erect, or non-inverted image) and light beams a, j and o reflect off of mirror 309b are shifted –1½ columns to the right on MEMS 310.

Light beams from MEMS 310 are directed through the spherical lens and onto either mirror 311a or mirror 311b depending on the tip angle of the pixels in MEMS 310. In this example, the pixel tip angle for light beam d is directed up +⊖ and it converges on mirror segment 311a, while the pixel tip angles for light beams a, j and o are directed down –⊖ and converges on mirror 311b.

Mirror 311a and mirror 311b are tipped to shift the columns by +/–1 column. The shift is set for a whole number of columns because MEMS 310 and MEMS 312 both have 5×4 pixel matrix arrays. Mirror 311a is tipped to shift the light beam left –1 column, while mirror 311b is set to shift the light beam right +1 columns as they land on MEMS 312. (MEMS 312 is an inverted image of MEMS 310 so the light beams only appear to have shifted in the opposite directions). Continuing with the example, light beam d is reflected from mirror 311a through the spherical lens onto MEMS 312 and is shifted to the left 1 column. Light beams a, j and o are reflected from mirror 311b through the spherical lens onto MEMS 312 and are shifted right 1 column.

The light beams from MEMS 312 pass through the spherical lens and converge on mirror 313a or mirror 313b. Again, depending on the tip angle of the pixel, the light beams are directed to a particular mirror. In this example, the tip angle for the pixels for light beams d and j are tilted up +⊖ and light beams d and j converge on mirror 313a, while the pixels for light beams a and o are tilted down –⊖ and light beams a and o converge on mirror 313b. Mirror 313a and mirror 313b are tipped so that they shift the light beam either +/–½ column. The light beams are shifted +/–½ column because output 314 is again a 4×4 pixel matrix array, and is thus, shifted ½ column with respect to MEMS 312. Continuing with the example, light beams a and o from MEMS 312 and are bounced off of mirror 313b and they are shifted to the right ½ column, while light beams d and j are bounced off mirror 313a and are shifted to the left ½ column. As can be seen from the example at MEMS 314, light beam a has been shifted 1 row down and 1 column to the right, light beam d has been shifted 1 column to the left and 2 rows down, light beam j has been shifted 1 row down, and light beam o has been shifted 4 rows up and 1 column to the right.

In this exemplary embodiment, light beams may be shifted any number of rows from between –3 rows to +3 rows and any number of columns from –3 columns to +3 columns. The light beam may be shifted from –3 rows to +3 rows because mirrors 303a/b are set to shift the light beams +/–1½ rows, mirrors 305a/b are set to shift_the light beams +/–1 row and mirrors 307a/b are set to shift the light beams +/–½ rows, depending on which of the pairs of mirrors the light beams are directed. In the example, light beam a was directed to mirror 303b (–1½ rows), mirror 305b (+1 row) and mirror 307b (–½ row). (Keep in mind mirror 305b creates an inverted image so the apparent –1 row shift is actually +1 row shift.) As a result, light beam a is shifted –1½ rows, +1 row and –½ row for a total shift of –1 row or 1 row down. Similarly, the columns may be shifted from –3 columns to +3 columns because the tip angles of mirror 309a/b is +/–½ columns, the tip angle of mirrors 311a/b are a +/–1 column respectively and the tip angle or mirrors 313a/b +/–½ columns. Thus, the shift of +3 columns can be achieved by directing the light beam to mirror 309a, mirror 311b and mirror 313a, which would be set at +1½, +1 and +½ respectively for a total of 3. Similarly, the light beams can be shifted –3 columns by directing the light beams to mirror 309b, mirror 311a and mirror 313b. Mirror 309b is shifted –1½ columns, mirror 311a is shifted –1 columns (because of the inverted image) and mirror 313c is shifted –½ for a total of 3 columns left. In the example, light beam a was shifted –1½ columns +1 column –½ columns for a total of –1 column.

In this embodiment, there is at least one way to arrive at all of the possible shifts, with two ways to arrive at a shift of zero (+1½, –1, –½ or –1½+1, +½). The Fourier mirror that the light beam is directed to is preferably chosen so that the resultant shift puts the beam closer to its desired final position than the other possibilities. In the case of a desired zero total shift, the mirror for the first shift should be chosen to keep the beam closer to the center of the array allowing for the size of the MEMS array to be minimized. The MEMS arrays needed in this embodiment need be no larger than 5×4 array or 4×5 array for a 4×4 input array. This is accomplished by shifting the light beams on the outside rows or columns inward. For example, a light beam in the top row of a 4×4 input array has a net shift between 0 and 3 rows down, so the first shift is a 1½ row shift down; this eliminates the need for a row of pixels at a point ½ row up on the subsequent MEMS. Similarly light beams in the bottom row get a 1½ row shift up and thus, no row of pixels is needed below the 5th row on the subsequent MEMS. Proper shifting allows only five rows to be needed at the subsequent MEMS in this embodiment.

This technique may be used for any number of inputs. In general for an N-input system configured in an $N^{1/2} \times N^{1/2}$ array, in order to shift from any input row, $R_{in}$, to any output row, $R_{out}$ the magnitude of the shifts required are given by $$R_{out} = R_{in} +/- (N^{1/2}-1)/2 +/- N^{1/2}/4 +/- N^{1/2}/8 \ldots +/- 1 +/- 0.5 \quad (1)$$

Similarly the column shifts are given by $$C_{out} = C_{in} +/- (N^{1/2}-1)/2 +/- N^{1/2}/4 +/- N^{1/2}/8 \ldots +/- 1 +/- 0.5 \quad (2)$$

The net shift of any light beam is between plus and minus $(N^{1/2}-1)$. The shifts count down in a binary sequence (each shift is half that of the next) ending with the smallest shift of +/–½. The resolution required is set by the difference between the smallest shifts possible, ½–(–½)=1 row or column. In addition, the largest shifts are slightly smaller than twice that of the second largest shifts so that a net shift of zero is possible.

Since the shifts count is in a binary sequence, the total number of shifts required is determined using a log in base 2. For the rows there are $(2N^{1/2}-1)$ possible shifts required between plus and minus $(N^{1/2}-1)$, requiring $\log_2(2N^{1/2})$ shifts. Since the columns are shifted similarly, the total number of shifts required, S, to get a light beam to any of the desired locations can be determined using $$S = \log_2(2N^{1/2}) + \log_2(2N^{1/2}) = \log_2 N + 2 \quad (3)$$

or S=6 shifts for an N=16 input system.

In the above described embodiment the largest MEMS dimension is 5 (pixels). For a larger number of inputs, the shifts can be ordered so that the largest dimension of an array, A, is given by $$A = p(N^{1/2} + N^{1/2}/4 + N^{1/2}/4) = 1.5 p N^{1/2} \quad (4)$$

where p is the pixel pitch. This is accomplished by having the second largest shift occur first and the largest shift occurring second. Since the second largest shift is of size $N^{1/2}/4$, a light beam is moved no more than that many rows (the second largest shift) or columns outside of the input array size. After the second shift, the remaining shifts add up to no more than $(N^{1/2}/4) - 1$. As a result, in this MEMS array and in each subsequent, the row or column is shifted no more than a total of $(N^{1/2}/4) - 1$ outside the input array size. So the largest MEMS array is needed after the first shift, where the shift in row/column could be $N^{1/2}/4$ outside on either side of the current light beam position.

Figure 4A:
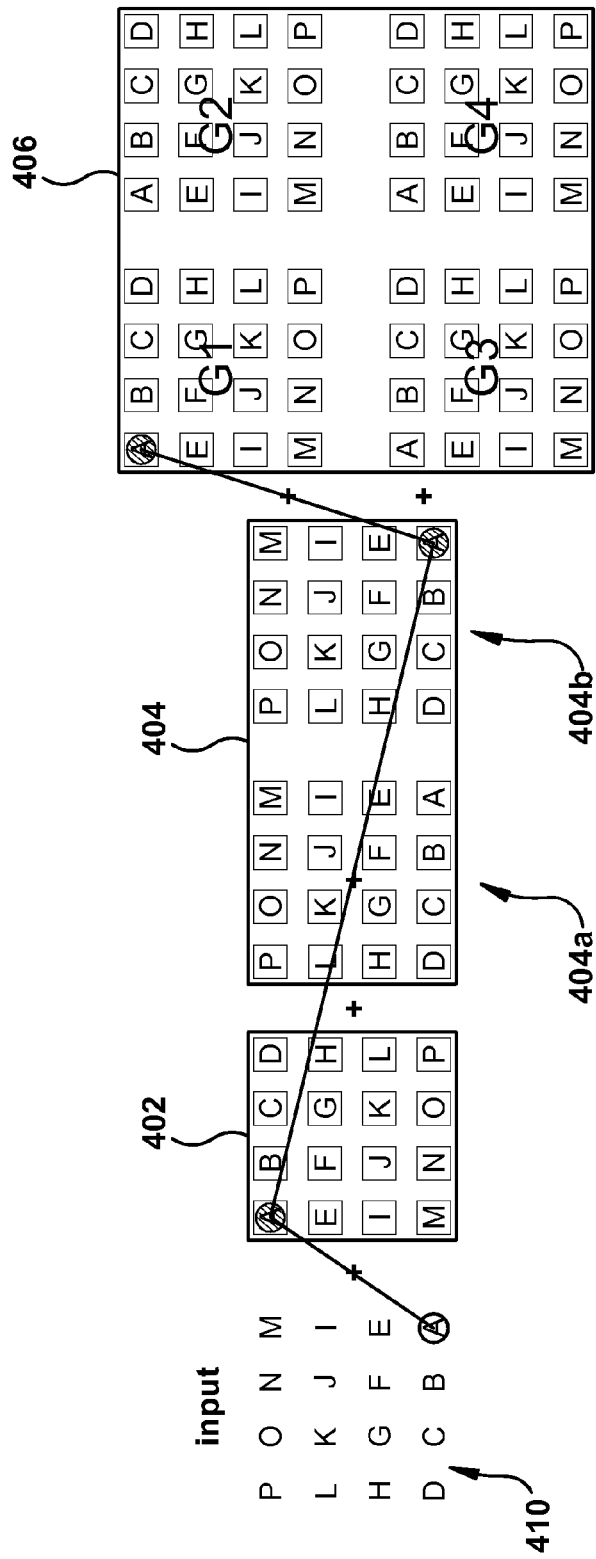
FIG. 4 is an exemplary embodiment for grouping optical light beams in a spherical Fourier cell configured for an optical cross-connect viewed from the center of the sphere. The top part (a) is a view as would be seen looking in one direction from the center of the sphere (toward the MEMS), and the bottom part (b) is a view as would be seen looking in the opposite direction.
Figure 4B:
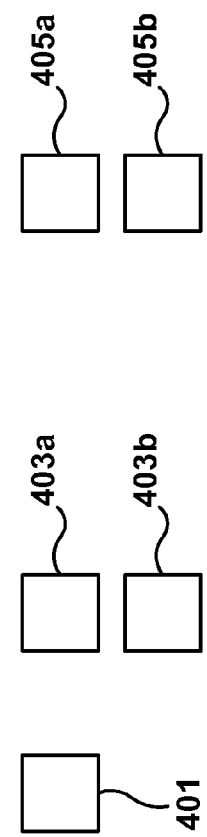

In FIG. 3, the examples follow four input light beams a, d, j and o, whose output locations were chosen such that the light beams were never incident on the same pixel in any of the MEMS arrays, i.e., no two light beams occupied the same input column and output row. In the worst case four light beams from one input column might need to be directed to the same output row. As a result, all the light beams would eventually overlap. Thus, the embodiment of FIG. 3 is not a non-blocking optical cross-connect. If a non-blocking optical cross-connect is desired, a grouping technique may be used. FIGS. 4 and 5 illustrate such an optical cross-connect.

The exemplary embodiment of FIG. 4 directs the light beams to different areas or groups so the locations of the light beams may be shifted without overlapping the light beams. FIG. 4 illustrates a portion of an embodiment of optical cross-connect using a grouping technique. Consolidating the light beams back into a single group may be achieved by reversing the process in FIG. 4.

The grouping of light beams from a 16-input light beam array into four different groups G1, G2, G3, and G4 is illustrated. Each group G1, G2, G3, and G4 is a 4×4 sub-array that can be an image of the initial input light beam array. The groups G1, G2, G3 and G4 are located in separate areas of MEMS 406, and the pixels for the group do not overlap one another. The number of groups, G, required for an N input system is $$G = N^{1/2} \quad (5)$$

This number of groups allow light beams to be directed to a particular group so that no two light beams are incident on the same pixel at the same time, i.e., there is no overlapping of the light beams.

A light beam, such as, for example, light beam a in the input array 410 can be moved to one of four different groups G1, G2, G3, and G4. First the input light beam array 410 is bounced off mirror 401 and imaged onto MEMS 402 whose pixels can be tilted to direct a light beam to either a top mirror 403a or bottom mirror 403b as previously described. The top and bottom mirrors 403a/b are used to create two different images on MEMS 404, one image at location 404a and one image at location 404b, next to one another. MEMS 404 is an 8×4 pixel matrix array. Images on locations 404a and 404b do not overlap. The two images are created by either tilting MEMS 402 pixels up +Θ to direct light beams to mirror 405a which is aligned to direct the light beams to location 404a or by tilting MEMS 402 pixels down −Θ directs light beams to mirror 405b which is aligned to direct the light beams to location 404b. Each light beam is directed to only one of the locations 404a, 404b.

The pixels in MEMS 404 may be tilted up +Θ to direct light beams to mirror 405a, or down −Θ to direct light beams to mirror 405b. Mirror 405a is aligned to direct light beams from locations 404a and 404b of MEMS 404 to groups G2 and G1 in MEMS 406 (the images are inverted from 404 but erect with respect to 402, having been inverted twice). Mirror 405b is tilted to direct light beams from locations 404a and 404b of MEMS 404 to groups G4 and G3 in MEMS 406. MEMS 406 has an 8×8 pixel matrix array. Each light beam a-p is directed to only one group. As a result, not all of the pixels in each of the groups G1, G2, G3, and G4 are used.

For example, the path of light beam a may be followed as it is moved into group G1. Light beam a from input 410 is Fourier-transformed through a spherical lens (not shown) onto mirror 403 and then inverse transformed onto MEMS 402, creating an inverted image of the input array. The pixel that light beam a is incident upon in MEMS 402 is tilted down −Θ and light beam a arrives at mirror 403b, and thus bounces to a pixel in location 404b on MEMS 404. The pixel for light beam a in location 404b of MEMS 404 is tilted up +Θ and consequently light beam a is sent to mirror 405a. Based on the alignment of mirror 405a, light beam a is sent to group G1 in MEMS 406. To regroup or consolidate the four groups back into a single 4×4 output matrix array, the above process is reversed. The number of MEMS and related bounces required to separate a light beam matrix into the $N^{1/2}$ groups needed is $\log_2 N^{1/2}$.

The exemplary embodiment illustrated in FIG. 5 draws on the embodiments described with respect to FIGS. 3 and 4. The embodiment of FIG. 5 can be broken into four sections, section 550, section 560 and section 570 on the MEMS side of the switch or lens (top of FIG. 5), and section 580 on the Fourier side (bottom of FIG. 5). Section 550 performs a grouping function as described with respect to FIG. 4. As described above, the light beams of the 4×4 matrix input array 540 are directed onto pixels in one of four groups G1, G2, G3 or G4 on MEMS 506, which has an 8×8 pixel matrix array. The light beams a-p are directed to one of the groups, group G1, G2, G3 or G4 via: mirror 501; MEMS 502; mirror 503a or mirror 503b; MEMS 504; and mirror 505a or mirror 505b as described with respect to FIG. 4.

Sections 560 and 580 are similar to the embodiment described with respect to FIG. 3 except that the MEMS arrays are larger than those of the embodiment in FIG. 3. For example, in FIG. 3, MEMS 302 was a 4×4 pixel matrix array, while in FIG. 5, corresponding MEMS 506 has an 8×8 pixel matrix array. Similarly, in FIG. 3, MEMS 304 has a 4×5 matrix pixel array, while corresponding MEMS 508 has an 8×10 matrix pixel array. The techniques for shifting the light beam columns and rows are similar to those previously described in detail.

Section 580 can be further broken down into section 580a and section 580b. In section 580a light beams are shifted to different rows. Mirrors 507a/b are aligned or tilted to shift the light beams +/−1½ rows, mirrors 509a/b are tilted to shift the light beams +/−1 row, and mirrors 511a/b are tilted to shift the light beams +/−½ row. Similarly, in section 580b the light beams may be shifted into a different column. Mirrors 513a/b are tilted to shift the light beams +/−1½ columns, mirrors 515a/b are tilted to shift the light beams +/−1 column, and mirrors 517a/b are tilted to shift the light beams +/−½ column.

Section 570 consolidates or recombines the groups G1, G2, G3 and G4 (each of which is a 4×4 matrix) back onto a single 4×4 matrix pixel array at MEMS 522. Light beams that are incident on pixels in group G1 and group G2 of MEMS 518 are directed to mirror 519*a* and in turn directed onto MEMS 520. Light beams that are incident on pixels in group G3 and group G4 are directed to mirror 519*b* and are also directed onto MEMS 520. In MEMS 520, group G3 overlaps group G1 and group G4 overlaps group G2. No light beams overlap, however, because all of the light beams have been shifted to their new locations prior to consolidation. Light beams from the left half of the pixels in MEMS 520 are directed to mirror 521*a*, which is tilted to direct the light beams onto the pixels in MEMS 522. Light beams form the right half of MEMS 520 are directed to mirror 521*b*, which is also tilted to direct the light beams onto the pixels in MEMS 522. Thus, the two groups of 4×4 arrays in MEMS 520 are consolidated onto one 4×4 array in MEMS 522. Again, no light beams overlap because all of the light beams were previously shifted to their new positions.

For example, in FIG. 5, the path of light beam a may be followed. In this example it is desired to shift light beam a up 1 row and to the left 1 column. To achieve this result and prevent overlapping of light beam a with other light beams, light beam a is directed to group G1. Light beam a starts out in the bottom right hand corner in input array 540. Light beam a is directed through the spherical lens (not shown) and Fourier-transformed onto mirror 501, back through the spherical lens and inverse transformed onto MEMS 502 creating an inverted image of input array 540 on MEMS 502. Light beam a is next directed to mirror 503*b*, which is tilted to direct the light to the right hand side of MEMS 504. Light beam a is directed to mirror 505*a* re-imaged onto the upper section of MEMS 506, specifically, the upper left section, or group G1.

After directing light beam a to group GI, light beam a is shifted up 1 row, via mirror 507*a*, MEMS 508, mirror 509*a*, MEMS 510, mirror 511*a* and MEMS 512 similarly to the way the light beams were shifted in FIG. 3, but light beam a remains in group G1. Likewise light beam a is shifted to the left 1 column via mirror 513*b*, MEMS 514, mirror 515*b*, MEMS 516, mirror 517*b*, and MEMS 518, yet remains in group G1. Light beam a has now moved to the desired location within group G1, and is then reconsolidated with the other light beams onto a single 4×4 array via mirror 519*a*, MEMS 520, mirror 521*a*, MEMS 522, mirror 523 and finally to output 530. At output 530, light beam a has been shifted 1 row up and 1 column to the left.

The number of bounces required to combine the groups is the same as the number of bounces to separate them, $\log_2 N^{1/2}$. In this embodiment, the total number of MEMS required, M, for the optical cross-connect switch are those required for the shifts, S, one for the input, one for the output, and those required for the separating and then recombining of groups is shown by formula:

$$M = S + 1 + \log_2 N^{1/2} + \log_2 N^{1/2} = 2 \log_2 N + 3 \quad (6)$$

The largest MEMS dimension for any one MEMS array in this embodiment is 10 pixels. The largest MEMS dimension, A, for a number of inputs, N, and pixel pitch, p, is given by Equation (7):

$$A = 1.5 \, pN^{3/4} \quad (7)$$

Comparing the blocking optical cross-connect switch with the non-blocking optical cross-connect with grouping, the largest MEMS array is only slightly larger but now the optical cross-connect switch is (reconfigurably) non-blocking.

The larger MEMS used for the reconfigurable non-blocking optical cross-connects with grouping have many more pixels than light beams present. For the exemplary embodiment shown in FIG. 5, the first half of the bounces after the groups are separated is used to adjust the row while the column remains constant. The groups are determined so that no two beams in the same group occupy the same input column. As a result, the entire column of pixels can be driven with one signal. Similarly, the groupings are determined so that no two beams occupy the same output row. For the second half of bounces i.e. where the columns are adjusted, the row remains constant, so only one signal needs to be used to drive the row. For any one MEMS, only N drive signals are required. This allows a reduced pin-out for controlling the MEMS packaging.

Figure 6:
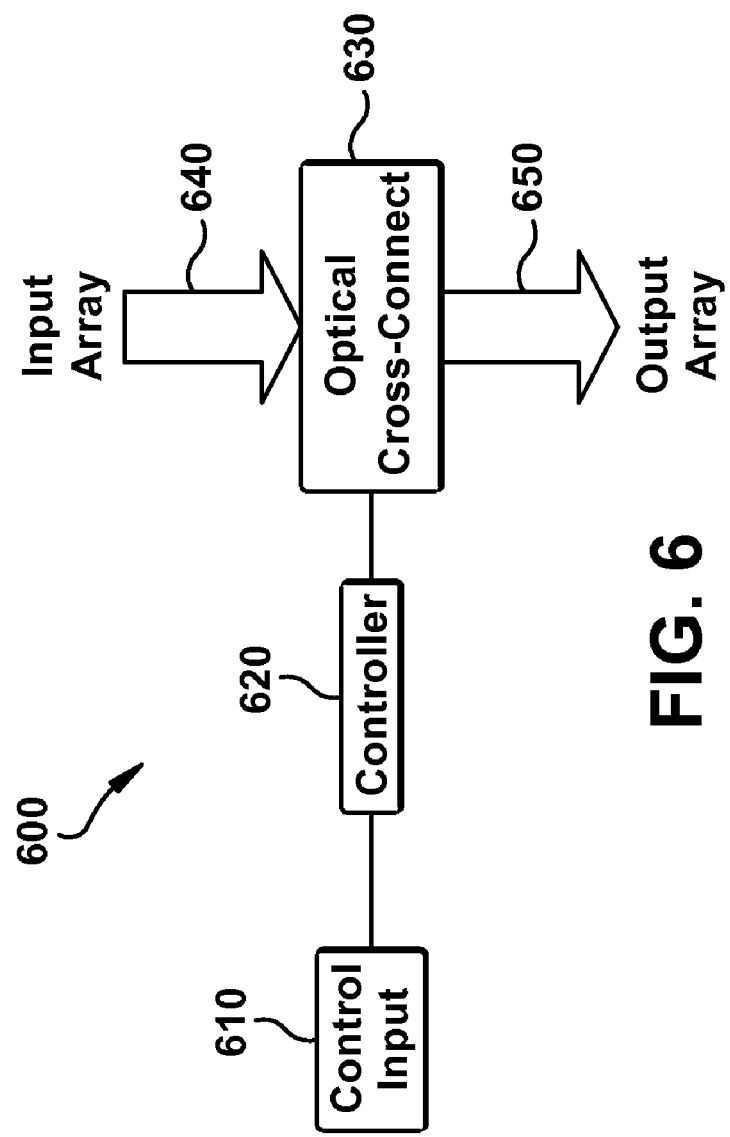
FIG. 6 is an exemplary embodiment of a control system for spherical Fourier cell optical cross-connect.

FIG. 6 illustrates a high level block diagram of a system 600 for an exemplary embodiment of an optical cross-connect 630. A control input 610 is electrically connected to a controller 620, such as a microprocessor. Optionally, the control input 610 may be optically, or wirelessly, coupled to controller 620. The control input 610 may be any type of input, such as, for example, a keyboard input, mouse or pointer input for manual control of the cross-connect, or a computer generated input for automated control. The controller 620 is electrically connected to the spherical Fourier cell optical cross-connect 630. An optical input array 640, such as, for example a 4×4 array of light beams from a fiber optic bundle is directed into optical cross-connect 630. The controller receives an input signal from control input 610 directing it to shift one or more of the light beams in the input array 640 to a different location in the output 650. The controller 620 selects the desired tip angles of the pixels (not shown) on the MEMS devices (not shown) to shift the light beams as directed by control input 610. The shifted array of light beams exits the system at output 650.

The use of Fourier transforms allow a large array of optical signals to be divided into a plurality of groups; manipulate those groups of light beams simultaneously, for example, shift some light beams one way, and shift other light beams another way; and then separate the light beams out into individual beams again for further processing. As discussed above, the spherical Fourier cell is just one way to implement this system. In addition, the form of the manipulation doesn't have to be time delays or shifting. The form of the manipulation may be other signal processing functions, such as, for example, spatial or spectral filtering. In addition, while a spherical lens has been described, any optical Fourier-transforming system, such as a thin lens, a thick lens, a lens system or mirror system may be used. In addition, the microelectrical-mechanical device may be replaced by any time of spatial light modulator device.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, analog MEMS can be used in the Fourier approaches described herein, which would reduce the overall MEMS chip count, since more than three states could be attained by the pixels (and thus a separate chip for every triplet of ±θ is not required). In addition, many cross-connects can be cascaded around the same lens. Still yet, configurations that provide grouping light beams, shifting light beams into different rows, and consolidating the light beams prior to shifting the light beams to different columns are possible and contemplated. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An optical cross-connect device for shifting the location of one or more light beams in an array of light beams comprising:
    an input array for inputting an array of light beams;
    a lens;
    a plurality of microelectrical-mechanical devices; and
    a plurality of mirrors;
    wherein the microelectrical-mechanical devices are located at a distance away from the principal planes of the lens that is approximately equal to the focal length of the lens;
    wherein the microelectrical-mechanical devices comprise controllable pixels for directing one or more light beams in the array of light beams through the lens and onto two or more of the plurality of mirrors;
    wherein the two or more of the plurality of mirrors are located at a distance away from the principal planes of the lens that is approximately equal to the focal length of the lens and are located generally opposite of one or more microelectrical-mechanical devices;
    wherein each of the two or more of the plurality of mirrors are positioned at different angles with respect to one another so that light beams incident on each mirror are shifted differently with respect to one another as they land on a subsequent microelectrical-mechanical devices.

2. The optical cross-connect device of claim 1 wherein the lens comprises a spherical lens.

3. The optical cross-connect device of claim 1 wherein the lens comprises a portion of a spherical lens.

4. The optical cross-connect device of claim 1 wherein the pixels are mirrors.

5. The optical cross-connect device of claim 1 wherein at least one of the light beams in the array of light beams are shifted to a different row in the array.

6. The optical cross-connect device of claim 1 wherein at least one of the light beams in the array of light beams are shifted to a different column in the array.

7. The optical cross-connect device of claim 1 wherein the array of light beams is separated into two or more groups prior to shifting the at least one light beam.

8. The optical cross-connect device of claim 1 wherein the two or more groups are reconsolidated after shifting the at least one light beam.

9. The optical cross-connect device of claim 1 wherein the controllable pixels are individually controllable.

10. A method of shifting the location of one or more light beams in a light beam array comprising:
    bouncing an array of light beams off of a microelectrical mechanical device;
    adjusting one or more pixels on the microelectrical mechanical device so that light beams incident on the one or more pixels are directed through at least a portion of a spherical lens onto at least a first mirror or a second mirror;
    shifting one or more of the light beams to a different location as a function of whether the pixels on the microelectrical mechanical device directs the light beams to the first mirror or the second mirror;
    repeating any of the previous steps until the light beams desired to be shifted have been shifted to a desired position; and
    separating the array of light beams into two or more groups prior to shifting one or more light beams to a desired position.

11. A method of shifting the location of one or more light beams in a light beam array comprising:
    bouncing an array of light beams off of a microelectrical mechanical device;
    adjusting one or more pixels on the microelectrical mechanical device so that light beams incident on the one or more pixels are directed through at least a portion of a spherical lens onto at least a first mirror or a second mirror;
    shifting one or more of the light beams to a different location as a function of whether the pixels on the microelectrical mechanical device directs the light beams to the first mirror or the second mirror;
    repeating any of the previous steps until the light beams desired to be shifted have been shifted to a desired position; and
    reconsolidating the two or more groups of light beams after shifting one or more light beams to a desired position.

12. A method of shifting the location of one or more light beams in a light beam array comprising:
    bouncing an array of light beams off of a microelectrical mechanical device;
    adjusting one or more pixels on the microelectrical mechanical device so that light beams incident on the one or more pixels are directed through at least a portion of a spherical lens onto at least a first mirror or a second mirror;
    shifting one or more of the light beams to a different location as a function of whether the pixels on the microelectrical mechanical device directs the light beams to the first mirror or the second mirror;
    repeating any of the previous steps until the light beams desired to be shifted have been shifted to a desired position; and
    using a signal to collectively drive one or more columns or rows of the pixels in each group.

13. An apparatus for shifting the location of one or more light beams in a light beam array comprising:
    means for bouncing an array of light beams off of a microelectrical mechanical device;
    means for adjusting one or more pixels on the microelectrical mechanical device so that light beams incident on the one or more pixels are directed through at least a portion of a lens onto at least a first mirror or a second mirror, wherein the microelectrical mechanical device, the lens, and at least the first mirror or the second mirror are arranged as a Fourier cell; and
    means for shifting one or more of the light beams to a different location as a function of whether the pixels on the microelectrical mechanical devices directed the light beams to the first mirror or the second mirror.

14. The apparatus of claim 13 further comprising means for separating the array of light beams into two or more groups.

15. An apparatus for shifting the location of one or more light beams in a light beam array comprising:
    means for bouncing an array of light beams off of a microelectrical mechanical device;
    means for adjusting one or more pixels on the microelectrical mechanical device so that light beams incident on the one or more pixels are directed through at least a portion of a lens onto at least a first mirror or a second mirror;

means for shifting one or more of the light beams to a different location as a function of whether the pixels on the microelectrical mechanical devices directed the light beams to the first mirror or the second mirror; and means for reconsolidating the two or more groups of light beams into a single array of light beams.

16. An apparatus for shifting the location of one or more light beams in a light beam array comprising:

means for bouncing an array of light beams off of a microelectrical mechanical device;

means for adjusting one or more pixels on the microelectrical mechanical device so that light beams incident on the one or more pixels are directed through at least a portion of a lens onto at least a first minor or a second mirror;

means for shifting one or more of the light beams to a different location as a function of whether the pixels on the microelectrical mechanical devices directed the light beams to the first mirror or the second mirror; and means for driving one or more of the pixels.

17. An apparatus for shifting the location of one or more light beams in a light beam array comprising:

means for bouncing an array of light beams off of a microelectrical mechanical device;

means for adjusting one or more pixels on the microelectrical mechanical device so that light beams incident on the one or more pixels are directed through at least a portion of a lens onto at least a first mirror or a second mirror; and means for shifting one or more of the light beams to a different location as a function of whether the pixels on the microelectrical mechanical devices directed the light beams to the first mirror or the second mirror, wherein the shifting means shifts the one or more light beams as a function of the adjustment to corresponding pixels.

18. The device of claim 13 further comprising grouping means for separating light beams from the array of light beams into two or more groups.

19. The device of claim 13 further comprising consolidation means for combining two or more groups of light beams into an array of light beams.

* * * * *